US010001096B2

(12) United States Patent
Thirlaway et al.

(10) Patent No.: US 10,001,096 B2
(45) Date of Patent: Jun. 19, 2018

(54) APPARATUS FOR MOUNTING ON A ROTATABLE PORTION OF A DIESEL FILTER (71) Applicant: Jaguar Land Rover Limited, Whitley, Coventry Warwickshire (GB)

(72) Inventors: George Thirlaway, Whitley (GB); Christopher Bibby; Andrew Roote, Whitley (GB); Steve Checkley, Whitley (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days. days.

(21) Appl. No.: 14/352,749

(22) PCT Filed: Sep. 25, 2012

(86) PCT No.: PCT/EP2012/068823
§ 371 (c)(1),
(2) Date: Apr. 18, 2014

(87) PCT Pub. No.: WO2013/056942
PCT Pub. Date: Apr. 25, 2013

(65) Prior Publication Data
US 2015/0122717 A1    May 7, 2015

(30) Foreign Application Priority Data

Oct. 21, 2011 (GB) .................................. 1118174.0

(51) Int. Cl.
*F02M 37/22*    (2006.01)
*G05G 1/12*    (2006.01)
(Continued)

(52) U.S. Cl.
CPC ........... *F02M 37/221* (2013.01); *B01D 29/88* (2013.01); *B01D 35/30* (2013.01); *G05G 1/12* (2013.01);
(Continued)

(58) Field of Classification Search
CPC ...... F02M 37/221; F02M 37/22; F02M 37/00; G05G 1/12; G05G 1/10; G05G 1/08;
(Continued)

(56) References Cited

U.S. PATENT DOCUMENTS 4,027,619 A * 6/1977 Sturhan et al. ............... 116/252
4,476,028 A   10/1984 Harris
(Continued)

FOREIGN PATENT DOCUMENTS

| EP | 1108884 A2 | 6/2001 |
| GB | 163784 A | 5/1921 |
| WO | WO2005079949 A1 | 9/2005 |

OTHER PUBLICATIONS

International Search Report for application No. PCT/EP2012/068823 dated Dec. 13, 2012, 4 pages.
(Continued)

*Primary Examiner* — David C Mellon
*Assistant Examiner* — Liam Royce
(74) *Attorney, Agent, or Firm* — Reising Ethington P.C.

(57) ABSTRACT

The present application relates to apparatus for mounting on a rotatable portion of a diesel filter for controlling a drainage valve. The apparatus comprises an outlet for draining liquid from the diesel filter, mounting apparatus for fixedly mounting the apparatus on the rotatable portion, and a manipulation portion for manipulation by a user's hand which projects, at least in part, radially outward from said rotatable portion, in use. The application also relates to a finger grip wheel for a diesel filter. The finger grip wheel has a drainage
(Continued)

outlet and at least one finger detent for accommodating a tip of a user's finger to facilitate rotation of the finger grip wheel.

21 Claims, 5 Drawing Sheets

(51) Int. Cl.
 *B01D 29/88* (2006.01)
 *B01D 35/30* (2006.01)
 *B25B 27/00* (2006.01)
(52) U.S. Cl.
 CPC ...... *B01D 2201/24* (2013.01); *B25B 27/0042* (2013.01); *Y10T 74/20762* (2015.01)
(58) Field of Classification Search
 CPC .......... G05G 1/00; B01D 29/88; B01D 29/00; B01D 35/005; B01D 35/16; B01D 36/006; B01D 35/30; B01D 2201/24; Y10T 74/20762
 USPC .......................................... 251/155; 210/248
 See application file for complete search history.

(56) References Cited

U.S. PATENT DOCUMENTS

| | | | |
|---|---|---|---|
| 4,643,053 A * | 2/1987 | Rhodes | B25B 27/0042 81/176.2 |
| 4,724,074 A | 2/1988 | Schaupp | |
| 4,893,651 A | 1/1990 | Herman et al. | |
| 4,964,330 A * | 10/1990 | Swinney | B25B 27/0042 81/125 |
| 5,035,797 A | 7/1991 | Janik | |
| 6,139,738 A * | 10/2000 | Maxwell | 210/248 |
| 6,258,269 B1 | 7/2001 | Knight | |
| 2009/0078631 A1* | 3/2009 | True-Dahl | B01D 35/18 210/175 |
| 2012/0193300 A1* | 8/2012 | Anderson et al. | 210/741 |

OTHER PUBLICATIONS

UK Search Report for corresponding application No. GB 11118174.0, dated Feb. 21, 2012, 1 page.

* cited by examiner

APPARATUS FOR MOUNTING ON A ROTATABLE PORTION OF A DIESEL FILTER

TECHNICAL FIELD

The present invention relates to apparatus for mounting on a rotatable portion of a diesel filter for controlling a drainage valve, to the combination of a diesel filter and such apparatus, and to a vehicle. The present invention also relates to a finger grip wheel for a diesel filter.

BACKGROUND OF THE INVENTION

Diesel fuel supplies can become contaminated with water which can, in turn, contaminate the fuel supply for a diesel engine of a motor vehicle. To counter this problem, it is common to provide a diesel filter to separate water from the fuel supplied to the engine. This is known as de-watering.

The diesel filter typically has a water trap in which water collects over a period of time. A water-in-fuel (WIF) sensor detects when the amount of water collected in the water trap has reached a predefined threshold. A notification, such as a lamp on the dashboard, indicates that the collected water should be drained from the diesel filter. The drainage is performed by opening a drainage valve provided on the diesel filter. This is not a specialist operation and it is intended that an individual can drain the water from the diesel filter without specialist knowledge or tools.

The drainage valve is typically provided at the bottom of the diesel filter and is opened and closed by rotating a thumbwheel provided at the base of the diesel filter. The thumbwheel typically has a knurled or ridged outer edge to allow it to be gripped by an individual. However, if there is limited or restricted access to the diesel filter, the individual may not be able readily to grip the thumbwheel; this may render it more difficult to operate the drainage valve. As fuel will also drain through the diesel filter, this can prove particularly problematic if the individual cannot readily close the drainage valve once the trapped water has been drained. Moreover, the thumbwheel may be contaminated with fuel rendering it more difficult to grip.

The present invention sets out, at least in certain embodiments, to overcome or ameliorate at least some of the above problems.

SUMMARY OF THE INVENTION

According to one aspect of the present invention, there is provided apparatus for mounting on a rotatable portion of a diesel filter for controlling a drainage valve, the apparatus comprising;
   an outlet for draining liquid from the diesel filter;
   mounting means for fixedly mounting the apparatus on the rotatable portion; and
   a manipulation portion for manipulation by a user's hand which projects, at least in part, radially outward from said rotatable portion, in use.

Accordingly, by virtue of the fact that the manipulation portion projects radially outward from the rotatable portion of the diesel filter, opening and closing of the drainage valve is advantageously facilitated because the apparatus affords the user a greater mechanical advantage over the rotatable portion, thus allowing increased torque to be applied to the rotatable portion. Moreover, in use, the apparatus may enable operation of the drainage valve of the diesel filter when there is limited access.

Typically, the outlet can be offset from a central (rotational) axis of the apparatus.

The rotatable portion may be a thumbwheel of the diesel filter or the rotatable body portion of a water-in-fuel sensor.

The mounting means may comprise at least one locating member. The apparatus could be an interference fit on the thumbwheel. For example, the mounting means could comprise a flange for positioning around at least a portion of the rotatable portion. Alternatively, the or each locating member may be a latching member for engaging a side of the rotatable portion. A radially inwardly directed flange may be provided on a distal end of the or each locating member. The or each locating member can be a resilient member.

Alternatively or additionally, the mounting means may comprise at least one mechanical fastener. The or each mechanical fastener may be a grub screw.

The rotatable portion of the diesel filter may be provided with a drainage port or nipple, for example in the form of a tubular member. The outlet in the apparatus could be an outlet aperture through which the drainage port extends. The outlet may comprise a nozzle for connection to the drainage port provided on the rotatable portion. The nozzle could be positioned over the drainage port, if present. The apparatus may comprise a sealing member for forming a seal between the nozzle and the drainage port. A recess may be formed inside the nozzle to house the sealing member. The sealing member can, for example, be an O-ring.

At feast initially, the liquid drained from the diesel filter is predominantly water, but some fuel may also be drained. To avoid contamination of mechanical components, a drainage conduit can optionally be provided to guide the liquid to a suitable location for collection. The drainage conduit may be connected to the outlet. Alternatively, the drainage conduit could be connected to the drainage port on the diesel filter. The drainage conduit can be arranged operatively to extend away from the wheels or brakes of a vehicle to prevent contamination. The drainage conduit can be permanently or removably attached to the apparatus.

The diesel filter typically has a water-in-fuel (WIF) sensor for detecting water collected in the diesel filler. A connector and/or an electrical lead may be provided for the WIF sensor. The apparatus may comprise an aperture to enable connection of an electrical connector to a sensor in the diesel filter. The aperture can be co-axial with a central (rotational) axis of the apparatus.

The manipulation portion may comprise a wheel. The wheel may have a larger diameter than the rotatable portion, affording the user greater mechanical advantage over the rotatable portion, thus allowing increased torque to be applied to the rotatable portion.

A protuberance could be provided on an exterior of the wheel to facilitate rotation of the wheel. Alternatively, or in addition, the wheel can comprise at least one finger detent to facilitate rotation of the wheel. The wheel may comprise a plurality of finger grip detents to facilitate rotation of the wheel. The finger grip detents may be formed around an outer circumference of the wheel. The finger detent can be sized to receive a user's fingertip. The wheel may locate over the top of the rotatable portion.

According to another aspect of the present invention, there is provided a combination of an apparatus as described above and a diesel filter. In the case that the manipulation portion of the apparatus is a wheel, the wheel may be shaped substantially to match an external profile of an outer casing of the diesel filter. The diesel filter typically has a cylindrical casing. The wheel can have a circular profile. The diameter of the wheel can substantially match the diameter of the cylindrical casing of the diesel filter.

The apparatus may be adapted to be retro-fitted to the diesel filter.

According to yet another aspect of the present invention, there is provided, a finger grip wheel for a diesel filter, wherein the finger grip wheel comprises a drainage outlet; and at least one finger detent for accommodating a tip of a user's finger to facilitate rotation of the finger grip wheel.

The finger grip wheel may comprise an aperture for connecting an electrical connector to a sensor.

According to a further aspect of the present invention, there is provided a vehicle comprising an apparatus, a combination or a finger grip wheel as described above.

The finger grip wheel described herein could be referred to as a twist wheel or a hand wheel.

Within the scope of this application it is envisaged that the various aspects, embodiments, examples, features and alternatives set out in the preceding paragraphs, in the claims and/or in the following description and drawings may be taken independently or in any combination thereof. For example, features described in connection with one embodiment are applicable to all embodiments, unless there is incompatibility of features.

BRIEF DESCRIPTION OF THE DRAWINGS

Embodiments of the present invention will now be described, by way of example only, with reference to the accompanying figures, in which.

DETAILED DESCRIPTION

Figure 1:
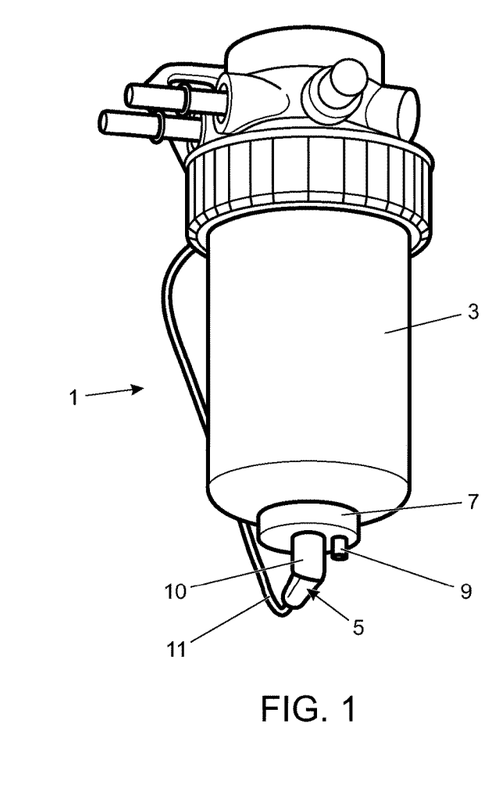
FIG. 1 shows a perspective view of a first, known type of diesel filter for a diesel engine.

An automotive fuel filter 1 for filtering particulates and debris from diesel fuel is illustrated in FIG. 1. The filter 1 is of conventional design and is supplied by Stanadyne®. The filter 1 also has a water trap for separating water from the diesel fuel.

The filter 1 comprises a housing 3, a water-in-fuel (WIF) sensor 5, and a rotatable portion, in the form of a thumbwheel 7, for opening and closing a drainage valve (not shown) provided at the bottom of the housing 3. A drainage port 9 is provided on the thumbwheel 7 to direct liquid drained from the housing 3. A connector 10 having an electrical lead 11 is connected to the WIF sensor 5 for transmitting a driver alert signal to notify that the volume of water collected in the housing 3 has reached a predetermined threshold and that the filter 1 should be drained.

To drain the filter 1, the thumbwheel 7 is rotated anti-clockwise to open the drainage valve to allow the collected water to be drained through the drainage port 9. Once the drainage has been completed, the thumbwheel 7 is rotated clockwise to close the drainage valve. An outer sidewall of the thumbwheel 7 has a knurled or ridged finish providing enhanced grip.

Opening and closing the drainage valve is intended to be performed by hand without the need for tools. However, if access to the thumbwheel 7 is limited or obstructed, it can prove difficult to rotate the thumbwheel 7 to drain the collected water.

Figure 2:
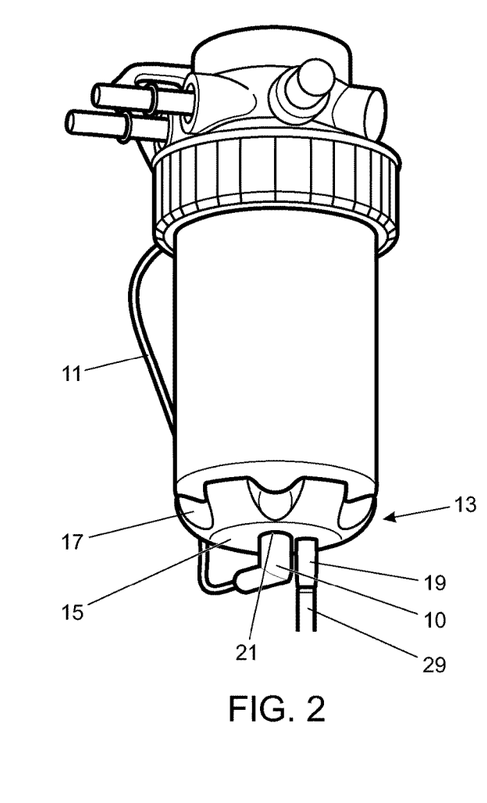
FIG. 2 shows an apparatus according to a first embodiment of the present invention fitted to the diesel filter shown in FIG. 1.

An apparatus for mounting on a rotatable portion of a diesel filter (i.e. the thumbwheel 7) according to a first embodiment of the present invention is shown in FIG. 2. The apparatus comprises a manipulation portion, in the form of a wheel 13, hereinafter referred to as a finger grip (twist) wheel.) The finger grip wheel 13 has a larger diameter than the thumbwheel 7 and provides improved accessibility and increased torque transfer. The finger grip wheel 13 can thereby facilitate operation of the drainage valve.

Figure 3A:
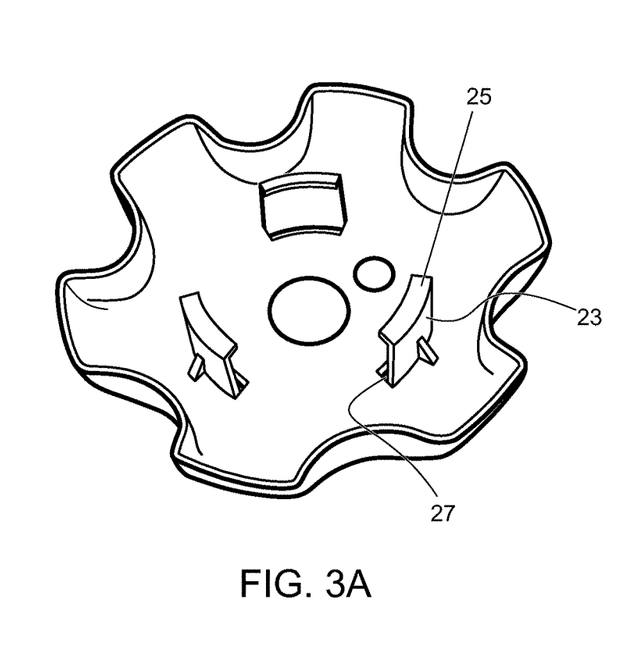
FIGS. 3A and 3B show bottom and top perspective views of the apparatus according to the first embodiment.
Figure 3B:
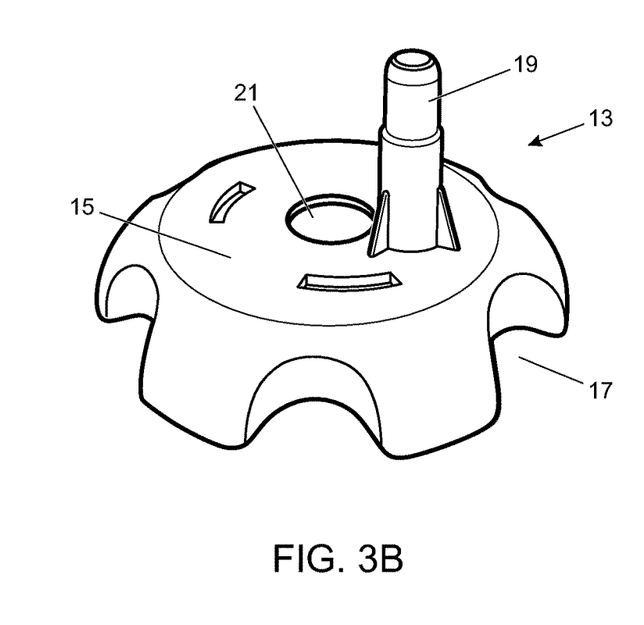

As shown in FIGS. 3A and 3B, the finger grip wheel 13 comprises a wheel portion 15, a series of finger detents 17, a nozzle 19, a central aperture 21 and three mounting elements 23 which are resilient latching arms that together comprise a mounting means for engaging the thumbwheel 7. A radially inwardly directed flange 25 is provided at the distal end of each latching arm 23 for location under the thumbwheel 7.

The finger grip wheel 13 is injection molded from a plastics material. Three access slots 27 are formed in the wheel portion 15 to accommodate molding tools for forming the radially inwardly directed flanges 25 on the distal end of each latching arm 23.

When the finger grip wheel 13 is installed on the thumbwheel 7, the latching arms 23 engage the sidewall of the thumbwheel 7 and restrict or prevent relative rotational movement between the thumbwheel 7 and the finger grip wheel 13. The flanges 25 at the distal ends of the latching arms 23 locate underneath the thumbwheel 7 and secure the finger grip wheel 13 in position. The finger grip wheel 13 can be fitted without modifying the filter 1 and could be retro-fitted.

The drainage port 9 of the thumbwheel 7 locates inside the nozzle 19. An O-ring seal (not shown) can be provided in an annular recess in the nozzle 19 to form a seal between the thumbwheel 7 and the finger grip wheel 13. A distal end of the nozzle 19 has a reduced diameter to receive a drainage conduit 29. The drainage conduit 29 can be directed to a convenient location for collecting liquids drained from the filter 1. For example, the drainage conduit 29 can direct the drained liquids away from the brakes or wheels of the vehicle to prevent contamination with fuel.

The aperture 21 is aligned with the water-in-fuel sensor 5 and allows the connector 10 to be attached or detached with the finger grip wheel 13 in situ. The water-in-fuel sensor 5 is mounted in the thumbwheel 7 in conventional manner. The thumbwheel 7 and the finger grip wheel 13 rotate together and can be unscrewed from the housing 3, for example to replace the water-in-fuel sensor 5. The radially inwardly directed flanges 25 can be released once the thumbwheel 7 has been unscrewed.

The wheel portion 15 has a generally circular plan form and the outside diameter of the finger grip wheel 13 is substantially the same as the outside diameter of the housing 3. The finger detents 17 are provided around the circumference of the wheel portion 15 and provide a driving surface for rotating the finger grip wheel 13 by hand. The finger detents 17 may be accessed from above the filter 1 enabling the drainage valve to be operated even when there is restricted or limited access from below.

Figure 4:
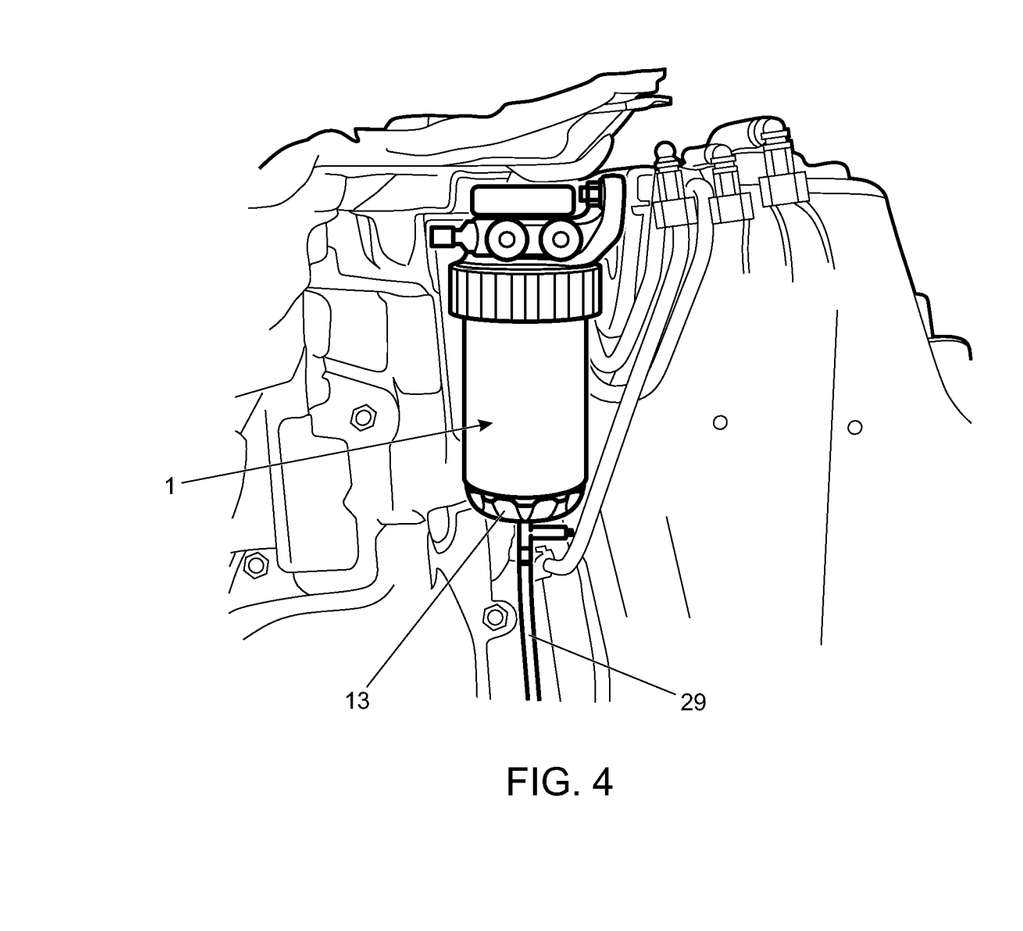
FIG. 4 shows a diesel filter fitted with the apparatus according to the first embodiment installed in an engine bay.

A typical installation of the filter 1 in an engine bay is illustrated in FIG. 4. The increased diameter of the finger grip wheel 13 means that it can be accessed from above the filter 1 allowing the drainage valve to be operated. In particular, an individual can reach the finger detents 17 and rotate the finger grip wheel 13. The thumbwheel 7 could thereby be rotated to open and close the drainage valve.

Figure 5:
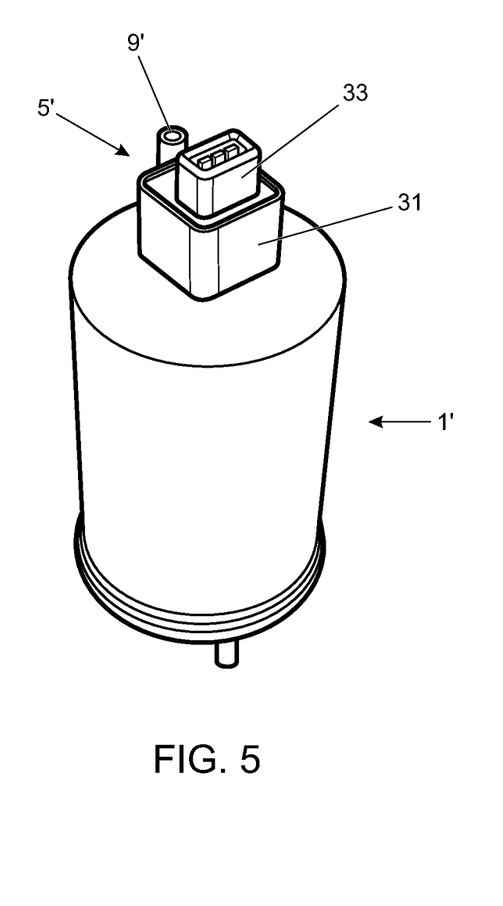
FIG. 5 shows a perspective view of a second type of diesel filter for a diesel engine.

It will be appreciated that various different types of diesel filters 1 are available. A perspective view of a second type of filter 1' is illustrated in FIG. 5. The filter 1' is supplied by Delphi® Automotive LLP.

Figure 6:
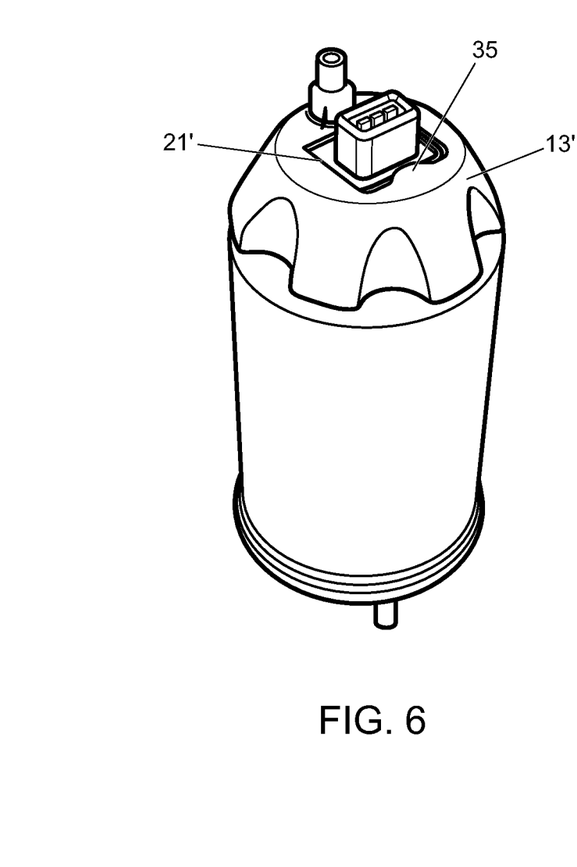
FIG. 6 shows an apparatus according to a second embodiment of the present invention fitted to the diesel filter shown in FIG. 5.

As shown in FIG. 6, apparatus according to a second embodiment of the present invention comprises a manipulation portion in the form of a finger grip wheel 13' provided for the filter 1'. The operation of the filter 1' and the finger grip wheel 13' is unchanged. Like reference numerals have been used for like components, albeit distinguished by a single quotation mark.

The filter 1' differs in that the thumbwheel 7 has been omitted and, instead, the water-in-fuel sensor 5' has a rectangular body portion 31 and a rectangular connector socket 33. The rotation of the rectangular body portion 31 opens/closes a drainage valve (not shown) and liquid is drained through the drainage port 9'.

The second embodiment of the finger grip wheel 13' has a generally rectangular aperture 21' to accommodate the socket 33. The aperture 21' is profiled to define a key 35 to prevent the finger grip wheel 13' being installed on the filter 1' incorrectly.

Figure 7A:
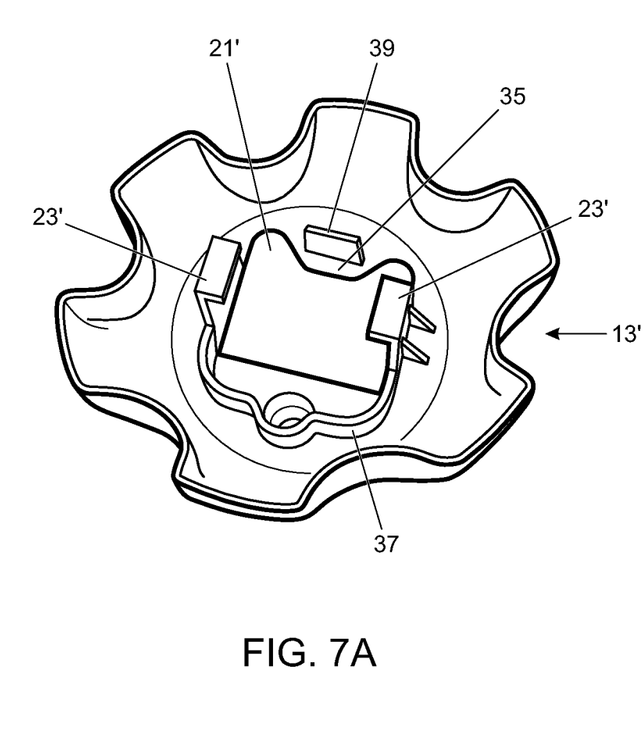
FIGS. 7A and 7B show top and bottom perspective views of the apparatus according to the second embodiment.

As shown in FIG. 7A, the finger grip wheel 13' has two opposing latching arms 23' for engaging the body portion 31 of the water-in-fuel sensor 5'. A flange 37 and a locating tab 39 are formed on an interior of the finger grip wheel 13' to locate the finger grip wheel 13' and prevent rotational movement of the finger grip wheel 13' relative to the body portion 31.

Figure 7B:
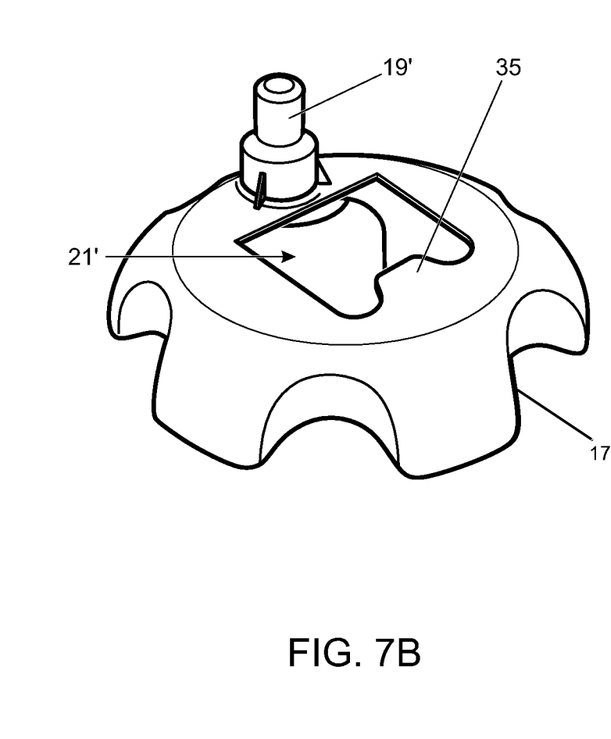

As shown in FIG. 7B, the finger grip wheel 13' has a series of finger detents 17' to provide a driving surface to facilitate rotation of the body portion 31 to open/close the drainage valve. A nozzle 19' is again provided for connection to a drainage conduit (not shown).

The operation of the second embodiment of the finger grip wheel 13' is the same as the first embodiment.

It will be appreciated that various changes and modifications can be made to the finger grip wheels 13; 13' described herein without departing from the scope of the present invention. For example, mounting means in the form of a mechanical fastener, such as a grub screw, could be provided to secure the finger grip wheel 13; 13' in position. The mechanical fastener could, for example, engage the sidewall of the thumbwheel. The mechanical fastener could be used instead of, or in addition to the locating member(s) described herein.

Furthermore, the manipulation portion of the apparatus need no comprise a wheel. For example, in one embodiment, the apparatus comprises a sleeve portion which is dimensioned so as to conform to a radially outer surface of the rotatable portion of a diesel filter which controls opening and closing of a drainage valve. In one embodiment, the sleeve is an interference fit, or push fit, with the rotatable portion of the diesel filter, which may be a thumbwheel or a rotatable body portion of a water in fuel sensor. Alternatively, the sleeve portion may comprise one or more latching members as described above, or one or more mechanical fasteners, such as grub screws. The manipulation portion of the apparatus comprises a plurality of spokes or arms which project radially outward from the sleeve portion. The spokes are disposed a regularly spaced positions around the outer circumference of the sleeve portion thereby allowing a user to apply an increased torque to the rotatable portion of the diesel filter. Alternatively, there may be a single lever arm which extends radially outward from the sleeve portion.

The invention claimed is:

1. A combination of:
a diesel filter comprising a rotatable portion for controlling a drainage valve, wherein the rotatable portion includes a drainage port through which liquid exits the rotatable portion in an axial direction substantially parallel to an axis of rotation of the rotatable portion, and wherein the rotatable portion is a thumbwheel of the diesel filter or the rotatable body portion of a water-in-fuel sensor; and
an apparatus for mounting on the rotatable portion, the apparatus comprising:
an outlet for draining liquid from the diesel filter, the outlet having an outlet aperture through which at least a portion of the drainage port of the rotatable portion extends, in use;
a mounting apparatus configured to fixedly mount the apparatus on the rotatable portion to restrict relative movement between the apparatus and the rotatable portion; and
a manipulation portion for manipulation by a user's hand, the manipulation portion projecting, at least in part, further outwards in a radial direction than said rotatable portion in order to facilitate rotation of the rotatable portion of the diesel filter, in use.

2. A combination according to claim 1, wherein the mounting apparatus comprises at least one locating member.

3. A combination according to claim 2, wherein one or more of the at least one locating members is a latching member for engaging a side of the rotatable portion.

4. A combination according to claim 2, wherein a radially inwardly directed flange is provided on a distal end of one or more of the at least one locating members.

5. A combination according to claim 1, wherein the mounting apparatus comprises at least one mechanical fastener.

6. A combination according to claim 5, wherein the or each mechanical fastener is a grub screw.

7. A combination according to claim 1, wherein the outlet comprises a nozzle for connection to the drainage port provided on the rotatable portion.

8. A combination according to claim 7 comprising a sealing member for forming a seal between the nozzle and the drainage port.

9. A combination according to claim 1, wherein a drainage conduit is connected to the outlet.

10. A combination according to claim 1, comprising a sensor aperture to enable connection of an electrical connector to a sensor in the diesel filter.

11. A combination according to claim 1, wherein the manipulation portion comprises a wheel.

12. A combination according to claim 11, wherein the wheel comprises a plurality of finger grip detents to facilitate rotation of the wheel.

13. A combination according to claim 12, wherein the finger grip detents are formed around an outer circumference of the wheel.

14. A combination according to claim 11, wherein the wheel locates over the rotatable portion.

15. A combination according to claim 1, wherein the manipulation portion comprises a wheel, and wherein the wheel has a major diameter that matches a diameter of an outer casing of the diesel filter.

16. A combination according to claim 1, wherein the apparatus is adapted to be retro-fitted to the diesel filter.

17. A vehicle comprising a combination according to claim 1.

18. A combination according to claim 1, wherein the outlet comprises a nozzle that fits over the drainage port.

19. A combination according to claim 1, wherein the outlet aperture is oriented in a radial plane relative to the axis of rotation of the rotatable portion.

20. A combination according to claim 1, wherein the manipulation portion is configured such that when the manipulation portion is manipulated by a user's hand, the manipulation portion moves together with the rotatable portion of the diesel filter.

21. A combination according to claim 1, wherein the mounting apparatus comprises one of:
- an interference fit between the apparatus and the rotatable portion of the diesel filter; or
- a latching member configured to engage a side of the rotatable portion of the diesel filter.

* * * * *